UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

MAKING PHOSPHATIC FERTILIZERS.

SPECIFICATION forming part of Letters Patent No. 446,998, dated February 24, 1891.

Application filed September 30, 1889. Renewed December 20, 1890. Serial No. 375,310. (Specimens.)

*To all whom it may concern:*

Be it known that I, JOSEPH VAN RUYMBEKE, a citizen of Belgium, residing at Chicago, in the county of Cook, in the State of Illinois, have invented a certain new and useful Improvement in the Process of Producing Soluble Iron and Alumina Acid Phosphates, which is fully set forth in the following specification.

Iron and alumina acid phosphates as heretofore have either been largely insoluble in water or sticky and highly deliquescent.

My process consists in a new process of producing iron and alumina acid phosphate which will make it soluble in water and largely non-deliquescent. I have in an application of even date herewith, Serial No. 325,494, filed September 30, 1889, described one process whereby I obtain the desired result to a large degree.

In the process which I now describe I take a phosphate and reduce it to a fine powder, then add thereto muriate of potash, or preferably sulphate of potash of a low grade—such, for instance, as kainit or so-called "double-manure salt"—in the proportion desired to obtain the final fertilizer of commerce.

I ordinarily use about eight pounds of kainit to five hundred pounds of phosphate, the quantity of kainit, however, being largely varied. To this mixture I add the desired quantity of sulphuric acid, to be determined in each instance by the analysis of the phosphate, the same as is now determined in treating phosphates for fertilizers. I then take the resultant product after such last treatment and submit it to a heat sufficient to give it a gray color, the natural color being red. When it assumes a gray color, it becomes largely soluble in water, is not sticky, and substantially non-deliquescent. The temperature to which the resultant product is submitted is usually about 400°, and the length of time to which it is submitted to this heat varies considerably; but in two-ton lots it takes about twelve hours when heated in a revolving cylinder. It should be heated, however, until the product assumes a gray color. The product consists of metaphosphate, alum, sulphate of alumina, and sulphate of iron, and when muriate of potash is used the product also contains chloride of iron and alumina. The proportions of each are dependent upon the analysis of the raw material and the amount of salts of potash used.

The effect of the potash which is in the muriate, or the sulphate aforesaid, is to form alums with the sulphates of alumina iron produced from phosphate by the action of the sulphuric acid, whereby is facilitated the removal of the sticky and deliquescent character. The action of the heat completes the reaction of the acid upon the phosphates. The process is completed when the heat is continued until a gray color is given to the product. By this treatment of phosphates I have a resultant which is highly soluble in water, free from stickiness, and highly non-deliquescent.

Having thus described my invention, what I claim as new, and desire to secure by Letters Patent, is—

The process described of first taking iron and alumina phosphate, pulverizing the same, mixing it with muriate of potash, or preferably low-grade sulphate of potash, treating the mixture with sulphuric acid, and then subjecting it to heat until the acid phosphate contained is converted into metaphosphate, substantially as specified.

JOSEPH VAN RUYMBEKE.

Witnesses:
ABBIE M. BEST,
L. L. COBURN.